United States Patent
Goto et al.

(10) Patent No.: US 12,542,601 B2
(45) Date of Patent: Feb. 3, 2026

(54) WIRELESS COMMUNICATION SYSTEM, RELAY APPARATUS AND WIRELESS COMMUNICATION METHOD

(71) Applicant: NTT, Inc., Tokyo (JP)

(72) Inventors: Daisuke Goto, Musashino (JP);
Kiyohiko Itokawa, Musashino (JP);
Yasuyoshi Kojima, Musashino (JP);
Fumihiro Yamashita, Musashino (JP);
Yosuke Fujino, Musashino (JP); Kento Yoshizawa, Musashino (JP);
Kazumitsu Sakamoto, Musashino (JP)

(73) Assignee: NTT, Inc., Tokyo (JP)

( * ) Notice: Subject to any disclaimer, the term of this patent is extended or adjusted under 35 U.S.C. 154(b) by 487 days.

(21) Appl. No.: 17/925,463

(22) PCT Filed: May 20, 2020

(86) PCT No.: PCT/JP2020/019967
§ 371 (c)(1),
(2) Date: Nov. 15, 2022

(87) PCT Pub. No.: WO2021/234864
PCT Pub. Date: Nov. 25, 2021

(65) Prior Publication Data
US 2023/0179289 A1    Jun. 8, 2023

(51) Int. Cl.
*H04B 7/185* (2006.01)
*H04B 7/01* (2006.01)
*H04B 7/195* (2006.01)

(52) U.S. Cl.
CPC ........... *H04B 7/18513* (2013.01); *H04B 7/01* (2013.01); *H04B 7/195* (2013.01)

(58) Field of Classification Search
CPC ...... H04B 7/18513; H04B 7/01; H04B 7/195; H04B 7/185; H04B 7/15542; H04B 7/1851; H04B 7/15528
See application file for complete search history.

(56) References Cited

U.S. PATENT DOCUMENTS 6,147,644 A * 11/2000 Castles .............. H04B 7/18547
                                                342/357.55
6,314,269 B1    11/2001 Hart et al.
(Continued)

FOREIGN PATENT DOCUMENTS

| CN | 1156525 A | 8/1997 |
|---|---|---|
| CN | 102934372 A | 2/2013 |
| JP | 2014204177 | 10/2014 |

OTHER PUBLICATIONS

Goto et al., "Capacity Evaluation of Low-earth Orbit Satellite-MIMO Systems," IEICE Transactions on Information and Systems B (Communications), Aug. 1, 2019, J102-B(8):614-623 (No Translation).

(Continued)

*Primary Examiner* — Keith Ferguson
(74) *Attorney, Agent, or Firm* — Fish & Richardson P.C.

(57) ABSTRACT

A mobile relay apparatus includes a first signal reception unit, a storage unit, and a second signal transmission unit. The first signal reception unit receives a first signal transmitted by a first communication apparatus. The storage unit stores waveform data indicating a waveform of the first signal. The second signal transmission unit transmits a second signal indicating the stored waveform data at a timing at which communication with the second communication apparatus is possible. The second communication apparatus includes a second signal reception unit, a second signal reception processing unit, and a first signal reception processing unit. The second signal reception unit receives a
(Continued)

second signal. The second signal reception processing unit receiving the second signal to acquire waveform data. The first signal reception processing unit receiving the first signal indicated by the waveform data to acquire data set in the first signal by the first communication apparatus.

5 Claims, 6 Drawing Sheets

(56) References Cited

U.S. PATENT DOCUMENTS

| | | | |
|---|---|---|---|
| 2008/0031174 A1* | 2/2008 | Saifullah | H04W 52/0219 455/15 |
| 2009/0209199 A1* | 8/2009 | Suga | H04B 7/155 455/7 |
| 2011/0053495 A1* | 3/2011 | Hara | H04B 7/15542 455/507 |
| 2013/0102240 A1 | 4/2013 | Helfers et al. | |

OTHER PUBLICATIONS

Kadowaki et al., "Recent Trends of Satellite Communication Technologies Applied to New Frontiers," IEICE Transactions on Information and Systems B, 2014, J97-B(11):979-991 (No Translation).

PCT International Search Report and Written Opinion in International Appln. No. PCT/JP2020/019967, dated Oct. 27, 2020, 6 pages (with English Translation).

Guidotti et al., "Architectures and Key Technical Challenges for 5G Systems Incorporating Satellites," CoRR, submitted Jun. 2018, arXiv:1806.02088, 18 pages.

Kodheli et al., "Satellite Communications in the New Space Era: A Survey and Future Challenges," IEEE Communications Surveys and Tutorials, Oct. 2020, 23(1):70-109, 40 pages.

Wang et al., "Convergence of Satellite and Terrestrial Networks: A Comprehensive Survey," IEEE Access, Dec. 2019, 8:5550-5588.

* cited by examiner

WIRELESS COMMUNICATION SYSTEM, RELAY APPARATUS AND WIRELESS COMMUNICATION METHOD

CROSS-REFERENCE TO RELATED APPLICATIONS

This application is a National Stage application under 35 U.S.C. § 371 of International Application No. PCT/JP2020/019967, having an International Filing Date of May 20, 2020, the disclosure of which is considered part of the disclosure of this application, and is incorporated by reference in its entirety into this application.

TECHNICAL FIELD

The present invention relates to a wireless communication system, a relay apparatus and a wireless communication method.

BACKGROUND ART

With the development of Internet of Things (IoT) technology, installation of IoT terminals equipped with various sensors in various places is under discussion. For example, it is also conceived that the IoT will be used to collect data on places where it is difficult to install base stations, such as buoys and ships on the sea, mountainous areas, and the like. On the other hand, there is a technology for wireless communication with a terrestrial communication apparatus using an unmanned aerial vehicle (UAV) or a geostationary satellite (refer to NPL 1, for example).

CITATION LIST

Non Patent Literature

[NPL 1] Naoto Kadowaki, et al., "Recent Trends of Satellite Communication Technologies Applied to New Frontiers", IEICE Journal B, Vol. J97-B No. 11, pp. 979-991, 2014

SUMMARY OF THE INVENTION

Technical Problem

NPL 1 describes a non-regenerative relay technology relating to geostationary satellites. However, when a relay apparatus is mounted on a low Earth orbit satellite or the like, the area where the relay apparatus can perform communication moves with the movement of the low Earth orbit satellite. Accordingly, the time for which communication apparatuses such as an IoT terminal and a base station installed on the Earth can communicate with the relay apparatus is limited.

In view of such circumstances, an object of the present invention is to provide a wireless communication system, a relay apparatus, and a wireless communication method which can wirelessly relay data wirelessly received from a communication apparatus to another communication apparatus even when an area in which communication is possible moves due to movement of a relay apparatus.

Means for Solving the Problem

One aspect of the present invention is a wireless communication system including a relay apparatus, wherein the relay apparatus includes a first signal reception unit that receives a first signal wirelessly transmitted by the first communication apparatus, a storage unit that stores waveform data indicating a waveform of the first signal received by the first signal reception unit, and a second signal transmission unit that wirelessly transmits a second signal indicating the waveform data stored in the storage unit to the second communication apparatus at a timing at which communication with the second communication apparatus is possible, and the second communication apparatus includes a second signal reception unit that receives the second signal wirelessly transmitted by the relay apparatus, a second signal reception processing unit that performs processing of receiving the second signal received by the second signal reception unit to acquire the waveform data, and a first signal reception processing unit that performs processing of receiving the first signal indicated by the waveform data acquired by the second signal reception processing unit to acquire data set in the first signal by the first communication apparatus.

One aspect of the present invention is a relay apparatus in a wireless communication system including a first communication apparatus, a second communication apparatus, and the mobile relay apparatus, the relay apparatus including a first signal reception unit that receives a first signal wirelessly transmitted by the first communication apparatus, a storage unit that stores waveform data indicating a waveform of the first signal received by the first signal reception unit, and a second signal transmission unit that wirelessly transmits a second signal indicating the waveform data stored in the storage unit to the second communication apparatus at a timing at which communication with the second communication apparatus is possible.

One aspect of the present invention is a wireless communication method executed by a wireless communication system including a first communication apparatus, a second communication apparatus, and a mobile relay apparatus, the wireless communication method including: a first signal reception step of receiving, by the relay apparatus, a first signal wirelessly transmitted by the first communication apparatus; a recording step of writing, by the relay apparatus, waveform data indicating a waveform of the first signal received in the first signal reception step in a storage unit; a second signal transmission step of wirelessly transmitting, by the relay apparatus, a second signal indicating the waveform data stored in the storage unit to the second communication apparatus at a timing at which communication with the second communication apparatus is possible; a second signal reception step of receiving, by the second communication apparatus, the second signal wirelessly transmitted in the second signal transmission step; a second signal reception processing step of performing, by the second communication apparatus, processing of receiving the second signal received in the second signal reception step to acquire the waveform data; and a first signal reception processing step of performing, by the second communication apparatus, processing of receiving the first signal indicated by the waveform data acquired in the second signal reception processing step to acquire data set in the first signal by the first communication apparatus.

One aspect of the present invention is a wireless communication method executed by a relay apparatus in a wireless communication system including a first communication apparatus, a second communication apparatus, and the mobile relay apparatus, the wireless communication method including: a first signal reception step of receiving a first signal wirelessly transmitted by the first communication apparatus; a recording step of writing waveform data indicating a waveform of the first signal received in the first signal reception step in a storage unit; and a second signal transmission step of wirelessly transmitting a second signal indicating the waveform data stored in the storage unit to the second communication apparatus at a timing at which communication with the second communication apparatus is possible.

Effects of the Invention

According to the present invention, even when a communicable area moves due to movement of a relay apparatus, data wirelessly received from a communication apparatus can be wirelessly relayed to another communication apparatus.

DESCRIPTION OF EMBODIMENTS

Hereinafter, embodiments of the present invention will be described in detail with reference to the drawings.

First Embodiment

Figure 1:
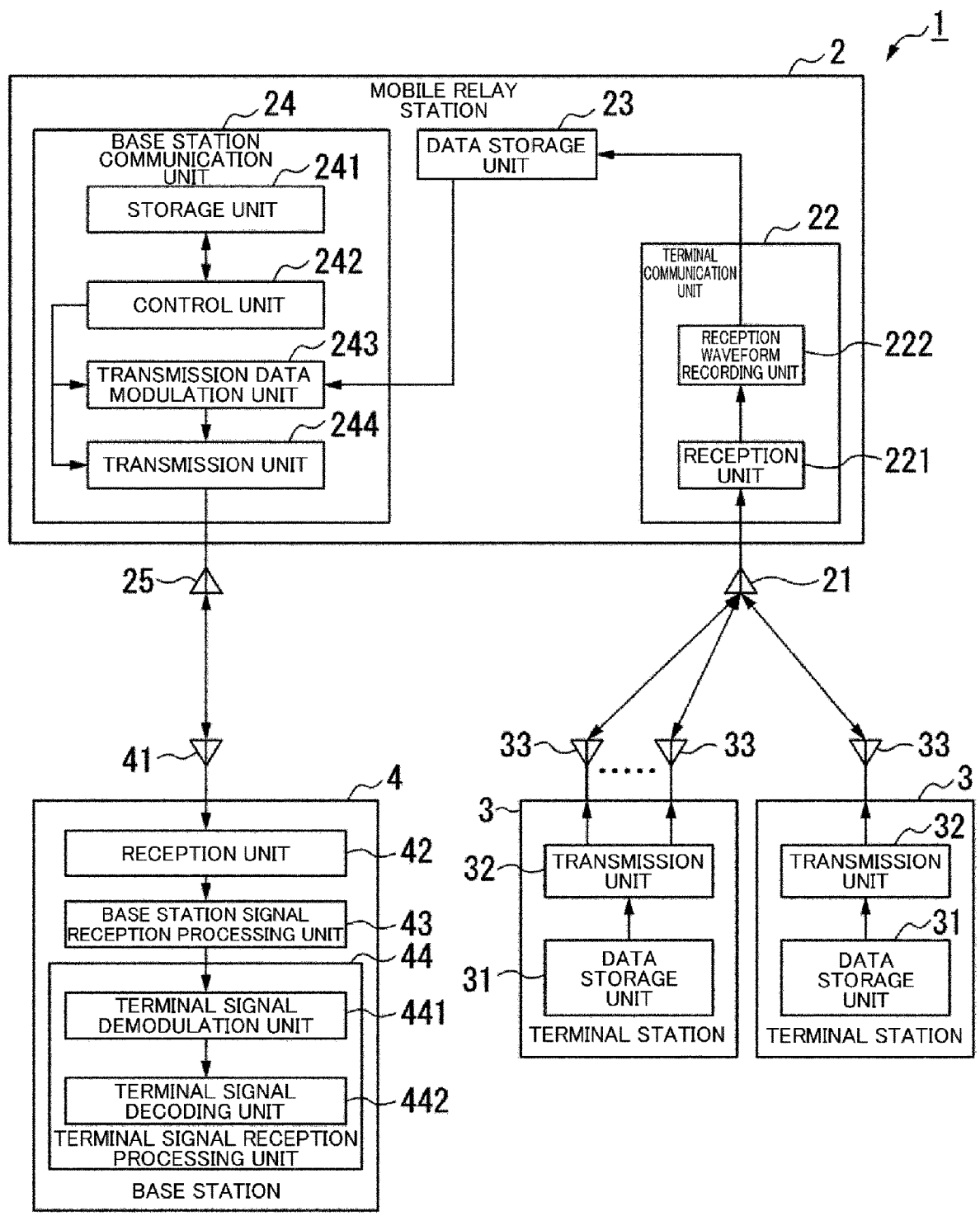
FIG. 1 is a configuration diagram of a wireless communication system according to a first embodiment of the present invention.

FIG. 1 is a configuration diagram of a wireless communication system 1 according to a first embodiment. The wireless communication system 1 includes a mobile relay station 2, a terminal station 3, and a base station 4. The number of each of the mobile relay station 2, the terminal station 3, and the base station 4 included in the wireless communication system 1 is arbitrary, but it is assumed that there are a large number of terminal stations 3.

The mobile relay station 2 is an example of a relay apparatus mounted on a moving body, and an area in which the mobile relay station 2 can perform communication moves with the passage of time. The mobile relay station 2 is provided in, for example, a low Earth orbit (LEO) satellite. The altitude of the LEO satellite is 2000 km or less, and the LEO satellite orbits over the Earth in about 1.5 hours. The terminal station 3 and the base station 4 are installed on the Earth such as on the ground or the sea. The terminal station 3 is, for example, an IoT terminal. The terminal station 3 collects data such as environmental data detected by a sensor and wirelessly transmits the data to the mobile relay station 2. In the figure, only two terminal stations 3 are shown. The mobile relay station 2 receives data transmitted from each of the plurality of terminal stations 3 through wireless signals while moving over the Earth. The mobile relay station 2 accumulates the received data and wirelessly transmits the accumulated data to the base station 4 at a timing at which communication with the base station 4 is possible. The base station 4 receives the data collected by the terminal station 3 from the mobile relay station 2.

It is conceivable to use a relay station mounted on an unmanned aerial vehicle such as a geostationary satellite, a drone or a high altitude platform station (HAPS) as a mobile relay station. However, in the case of a relay station mounted on a geostationary satellite, the coverage area (footprint) on the ground is wide, but a link budget for IoT terminals installed on the ground is considerably small due to a high altitude. On the other hand, in the case of a relay station mounted on a drone or a HAPS, the link budget is high, but the coverage area is narrow. Furthermore, drones require batteries and HAPSs require solar panels. In the present embodiment, the mobile relay station 2 is mounted on a LEO satellite. Therefore, in addition to keeping the link budget within a limit, the LEO satellite has no air resistance and consumes less fuel because it orbits outside the atmosphere. In addition, the footprint is also large as compared to the case where a relay station is mounted on a drone or a HAPS.

Since the mobile relay station 2 mounted on the LEO satellite communicates while moving at a high speed, the time for which each terminal station 3 or base station 4 can communicate with the mobile relay station 2 is limited. Specifically, when viewed on the ground, the mobile relay station 2 passes over the sky in about 10 minutes. Further, a wireless communication method having various specifications is used for the terminal station 3. Therefore, the mobile relay station 2 receives a terminal uplink signal from the terminal station 3 within a coverage at the current position during movement and stores waveform data of the received terminal uplink signal. The mobile relay station 2 wirelessly transmits a base station downlink signal in which the waveform data of the terminal uplink signal has been set to the base station 4 at a timing at which the base station 4 is present in the coverage. The base station 4 demodulates the base station downlink signal received from the mobile relay station 2 to obtain waveform data of the terminal uplink signal. The base station 4 obtains terminal transmission data which is data transmitted by the terminal station 3 by demodulating and decoding the terminal uplink signal represented by the waveform data.

The configuration of each apparatus will be described.

The mobile relay station 2 includes an antenna 21, a terminal communication unit 22, a data storage unit 23, a base station communication unit 24, and an antenna 25.

The terminal communication unit 22 includes a reception unit 221 and a reception waveform recording unit 222. The reception unit 221 receives a terminal uplink signal by the antenna 21. The reception waveform recording unit 222 samples a reception waveform of the terminal uplink signal received by the reception unit 221 and generates waveform data showing values obtained by sampling. The reception waveform recording unit 222 writes reception waveform information in which a reception time of the terminal uplink signal in the antenna 21 and the generated waveform data have been set in the data storage unit 23. The data storage unit 23 stores the reception waveform information written by the reception waveform recording unit 222.

The base station communication unit 24 transmits the reception waveform information to the base station 4 by means of a base station downlink signal of an arbitrary wireless communication method. The base station communication unit 24 includes a storage unit 241, a control unit 242, a transmission data modulation unit 243, and a transmission unit 244. The storage unit 241 stores a transmission start timing calculated in advance on the basis of orbit information of the LEO satellite equipped with the mobile relay station 2 and the position of the base station 4. The LEO orbit information is information by which the position, speed, moving direction, and the like of the LEO satellite at an arbitrary time can be obtained. A transmission time may be represented by, for example, an elapsed time from the transmission start timing.

The control unit 242 controls the transmission data modulation unit 243 and the transmission unit 244 such that they transmit the reception waveform information to the base station 4 at the transmission start timing stored in the storage unit 241. The transmission data modulation unit 243 reads the reception waveform information from the data storage unit 23 as transmission data and modulates the read transmission data to generate a base station downlink signal. The transmission unit 244 converts the base station downlink signal from an electronic signal to a wireless signal and transmits the wireless signal through the antenna 25.

The terminal station 3 includes a data storage unit 31, a transmission unit 32, and one or a plurality of antennas 33. The data storage unit 31 stores sensor data and the like. The transmission unit 32 reads sensor data from the data storage unit 31 as terminal transmission data and wirelessly transmits a terminal uplink signal in which the read terminal transmission data has been set through the antenna 33. The transmission unit 32 transmits a signal according to, for example, Low Power Wide Area (LPWA). Although the LPWA includes LoRaWAN (registered trademark), Sigfox (registered trademark), Long Term Evolution for Machines (LTE-M), Narrow Band (NB)-IoT, and the like, any wireless communication method can be used. Further, the transmission unit 32, as well as other terminal stations 3, may perform transmission by time division multiplexing, orthogonal frequency division multiplexing (OFDM), or the like. The transmission unit 32 determines a channel and a transmission timing to be used by the host station to transmit the terminal uplink signal by a method predetermined in a wireless communication method to be used. Further, the transmission unit may form a beam of signals transmitted from the plurality of antennas 33 by a method predetermined in the wireless communication method to be used.

The base station 4 includes an antenna 41, a reception unit 42, a base station signal reception processing unit 43, and a terminal signal reception processing unit 44. The reception unit 42 converts the terminal downlink signal received by the antenna 41 into an electronic signal. The base station signal reception processing unit 43 demodulates and decodes the received signal converted into the electronic signal by the reception unit 42 to obtain reception waveform information. The base station signal reception processing unit 43 outputs the reception waveform information to the terminal signal reception processing unit 44.

The terminal signal reception processing unit 44 performs processing of receiving the terminal uplink signal indicated by the reception waveform information. Here, the terminal signal reception processing unit 44 performs processing of receiving according to the wireless communication method used for transmission by the terminal station 3 to acquire terminal transmission data. The terminal signal reception processing unit 44 includes a terminal signal demodulation unit 441 and a terminal signal decoding unit 442.

The terminal signal demodulation unit 441 demodulates the waveform data and outputs symbols obtained by demodulation to the terminal signal decoding unit 442. The terminal signal demodulation unit 441 may perform demodulation after performing processing of compensating for the Doppler shift of the terminal uplink signal received by the antenna 21 of the mobile relay station 2 with respect to the signal indicated by the waveform data. The Doppler shift applied to the terminal uplink signal received by the antenna 21 is calculated in advance on the basis of the position of the terminal station 3 and the orbit information of the LEO equipped with the mobile relay station 2. The terminal signal decoding unit 442 decodes the symbols demodulated by the terminal signal demodulation unit 441 to obtain the terminal transmission data transmitted from the terminal station 3.

The operation of the wireless communication system 1 will be described.

Figure 2:
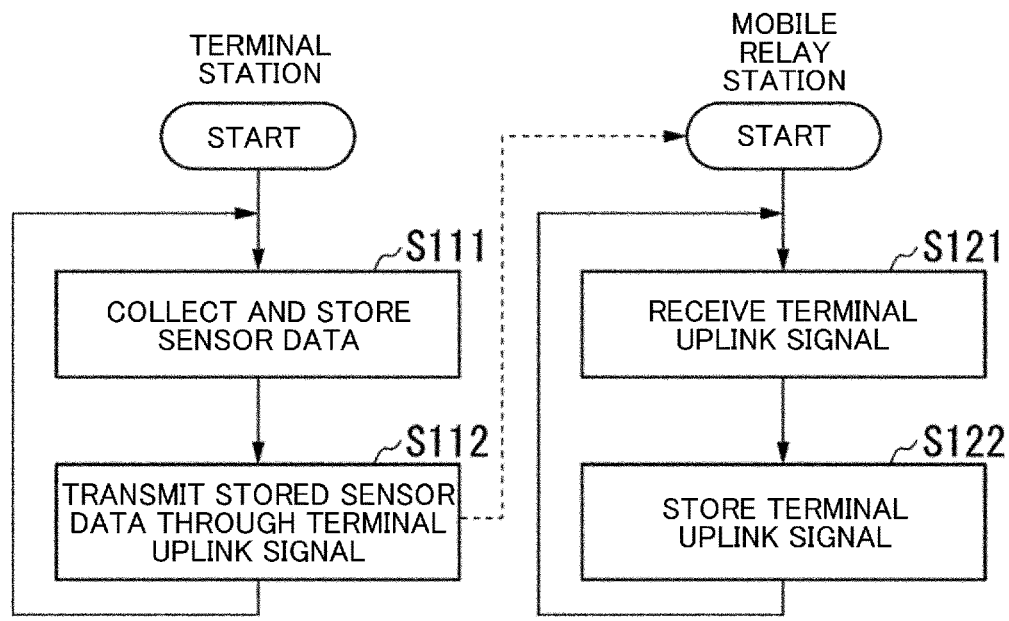
FIG. 2 is a flow chart showing processing of the wireless communication system according to the same embodiment.

FIG. 2 is a flow chart showing processing of the wireless communication system 1 when an uplink signal is transmitted from the terminal station 3. The terminal station 3 acquires data detected by a sensor which is not illustrated and is provided externally or internally at any time and writes the acquired data in the data storage unit 31 (step S111). The transmission unit 32 reads the sensor data from the data storage unit 31 as terminal transmission data. The transmission unit 32 wirelessly transmits a terminal uplink signal in which the terminal transmission data has been set through the antenna 33 at a transmission start timing obtained in advance on the basis of the orbit information of the LEO satellite equipped with the mobile relay station 2 (step S112). The terminal station 3 repeats processing from step S111.

The reception unit 221 of the mobile relay station 2 receives the terminal uplink signal transmitted from the terminal station 3 (step S121). Depending on the wireless communication method of the terminal station 3 that is a transmission source, there are cases where a terminal uplink signal is received from only one terminal station 3 on a time division basis for the same frequency and cases where terminal uplink signals are simultaneously received from a plurality of terminal stations 3 at the same frequency. The reception waveform recording unit 222 writes reception waveform information in which waveform data representing the waveform of the terminal uplink signal received by the reception unit 221 is associated with the reception time in the data storage unit 23 (step S122). The mobile relay station 2 repeats processing from step S121.

Figure 3:
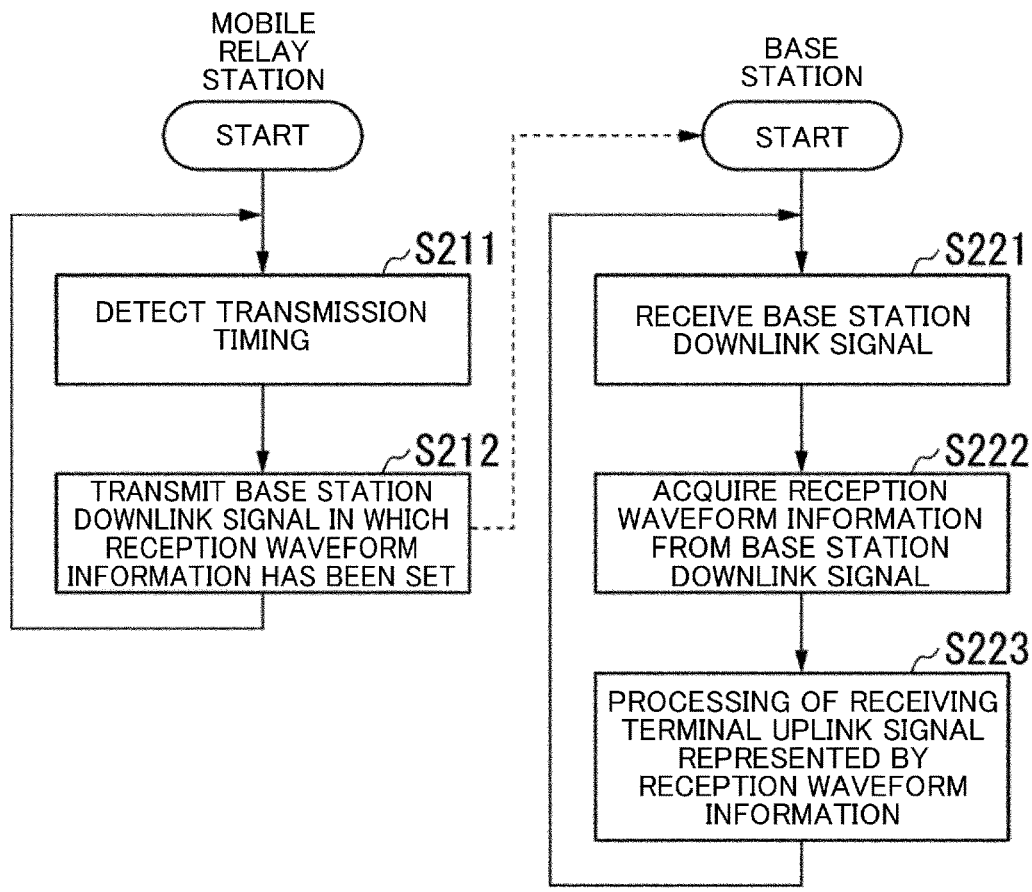
FIG. 3 is a flow chart showing processing of the wireless communication system according to the same embodiment.

FIG. 3 is a flow chart showing processing of the wireless communication system 1 when a base station downlink signal is transmitted from the mobile relay station 2. When the control unit 242 included in the base station communication unit 24 of the mobile relay station 2 detects arrival of a transmission start timing stored in the storage unit 241, the control unit 242 instructs the transmission data modulation unit 243 and the transmission unit 244 to transmit the reception waveform information (step S211). The transmission data modulation unit 243 reads the reception waveform information stored in the data storage unit 23 as transmission data and modulates the read transmission data to generate a base station downlink signal. The transmission unit 244 wirelessly transmits the base station downlink signal generated by the transmission data modulation unit 243 through the antenna 25 (step S212). The mobile relay station 2 repeats processing from step S211.

The antenna 41 of the base station 4 receives the base station downlink signal from the mobile relay station 2 (step S221). The reception unit 42 converts the base station downlink signal received by the antenna 41 into a received signal that is an electronic signal and outputs the received signal to the base station signal reception processing unit 43. The base station signal reception processing unit 43 demodulates the received signal and decodes the demodulated received signal (step S222). The base station signal reception processing unit 43 outputs reception waveform information obtained by decoding to the terminal signal reception processing unit 44.

The terminal signal reception processing unit 44 performs processing of receiving the terminal uplink signal represented by the waveform data included in the reception waveform information (step S223). Specifically, the terminal signal demodulation unit 441 identifies the wireless communication method used by the terminal station 3 to transmit the terminal uplink signal on the basis of information specific to the wireless communication method included in the received signal represented by the waveform data. The terminal signal demodulation unit 441 demodulates the received signal represented by the waveform data according to the identified wireless communication method and outputs symbols obtained by demodulation to the terminal signal decoding unit 442. The terminal signal decoding unit 442 decodes the symbols input from the terminal signal demodulation unit 441 according to the identified wireless communication method to obtain terminal transmission data transmitted from the terminal station 3. The terminal signal decoding unit 442 can also use a decoding method having a large calculation load, such as successive interference cancellation (SIC). The base station 4 repeats processing from step S221.

Second Embodiment

In the present embodiment, the mobile relay station transmits a base station downlink signal through a plurality of antennas. Hereinafter, a case where Multiple Input Multiple Output (MIMO) is used to transmit a base station downlink signal will be described as an example focusing on differences from the first embodiment.

Figure 4:
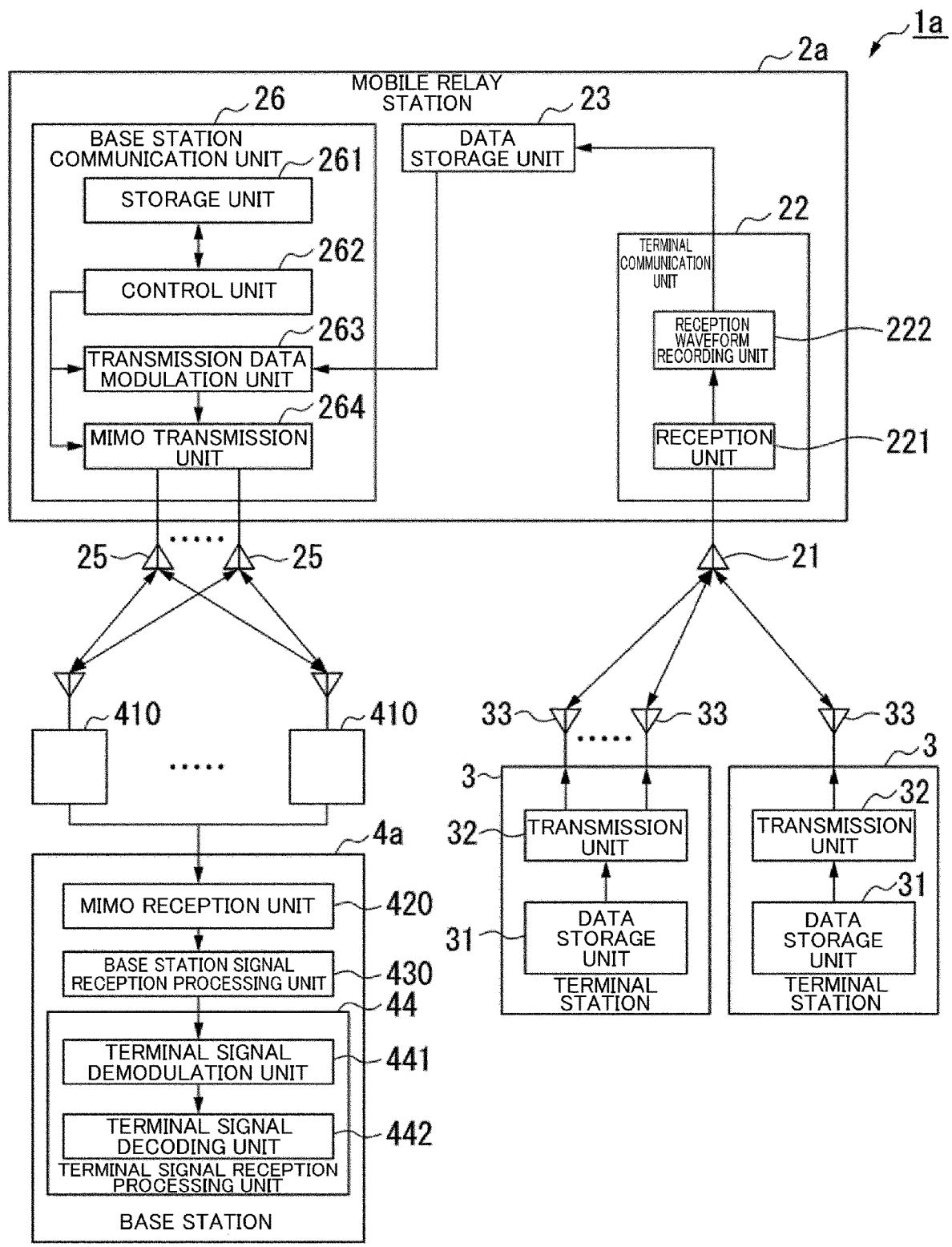
FIG. 4 is a configuration diagram of a wireless communication system according to a second embodiment.

FIG. 4 is a configuration diagram of a wireless communication system 1a according to a second embodiment. In the figure, the same components as those of the wireless communication system 1 in the first embodiment shown in FIG. 1 are designated by the same reference numerals and the description thereof will be omitted. The wireless communication system 1a includes a mobile relay station 2a, a terminal station 3, and a base station 4a.

The mobile relay station 2a includes an antenna 21, a terminal communication unit 22, a data storage unit 23, a base station communication unit 26, and a plurality of antennas 25. The base station communication unit 26 transmits reception waveform information to the base station 4a through MIMO. The base station communication unit 26 includes a storage unit 261, a control unit 262, a transmission data modulation unit 263, and a MIMO transmission unit 264. The storage unit 261 stores a transmission start timing calculated in advance on the basis of orbit information of an LEO satellite equipped with the mobile relay station 2a and the position of the base station 4a. Further, the storage unit 261 stores in advance a weight for each transmission time of a base station downlink signal to be transmitted through each antenna 25. The weight for each transmission time is calculated on the basis of the orbit information of the LEO satellite and the position of each antenna station 410 included in the base station 4a. A constant weight may be used regardless of the transmission time.

The control unit 262 controls the transmission data modulation unit 263 and the MIMO transmission unit 264 such that they transmit the reception waveform information to the base station 4a at the transmission start timing stored in the storage unit 261. Further, the control unit 262 indicates the weights for each transmission time read from the storage unit 261 to the MIMO transmission unit 264. The transmission data modulation unit 263 reads the reception waveform information from the data storage unit 23 as transmission data, converts the read transmission data into parallel signals, and then modulates the parallel signals. The MIMO transmission unit 264 weights the each of the modulated parallel signals by the weight indicated by the control unit 262 to generate a base station downlink signal to be transmitted through each of the antennas 25. The MIMO transmission unit 264 transmits the generated base station downlink signals through the antennas 25 according to MIMO.

The base station 4a includes a plurality of antenna stations 410, a MIMO reception unit 420, a base station signal reception processing unit 430, and a terminal signal reception processing unit 44. The antenna stations 410 are arranged at positions away from other antenna stations 410 such that differences in arrival angles of signals from the plurality of antennas 25 of the mobile relay station 2a increase. Each antenna station 410 converts base station downlink signals received from the mobile relay station 2a into an electronic signal and outputs the base station downlink signal to the MIMO reception unit 420.

The MIMO reception unit 420 aggregates base station downlink signals received from the plurality of antenna stations 410. The MIMO reception unit 420 stores a weight for each reception time for the base station downlink signal received by each antenna station 410 on the basis of the orbit information of the LEO satellite and the position of each antenna station 410. The MIMO reception unit 420 multiplies the base station downlink signal input from each antenna station 410 by a weight corresponding to the reception time of the base station downlink signal and synthesizes received signals by which weights have been multiplied. The same weight may be used regardless of the reception time. The base station signal reception processing unit 430 demodulates and decodes the synthesized received signal to obtain reception waveform information. The base station signal reception processing unit 430 outputs the reception waveform information to the terminal signal reception processing unit 44.

The operation of the wireless communication system 1a will be described.

Processing of the wireless communication system 1a when an uplink signal is transmitted from the terminal station 3 is the same as processing of the wireless communication system 1 of the first embodiment shown in FIG. 2.

Figure 5:
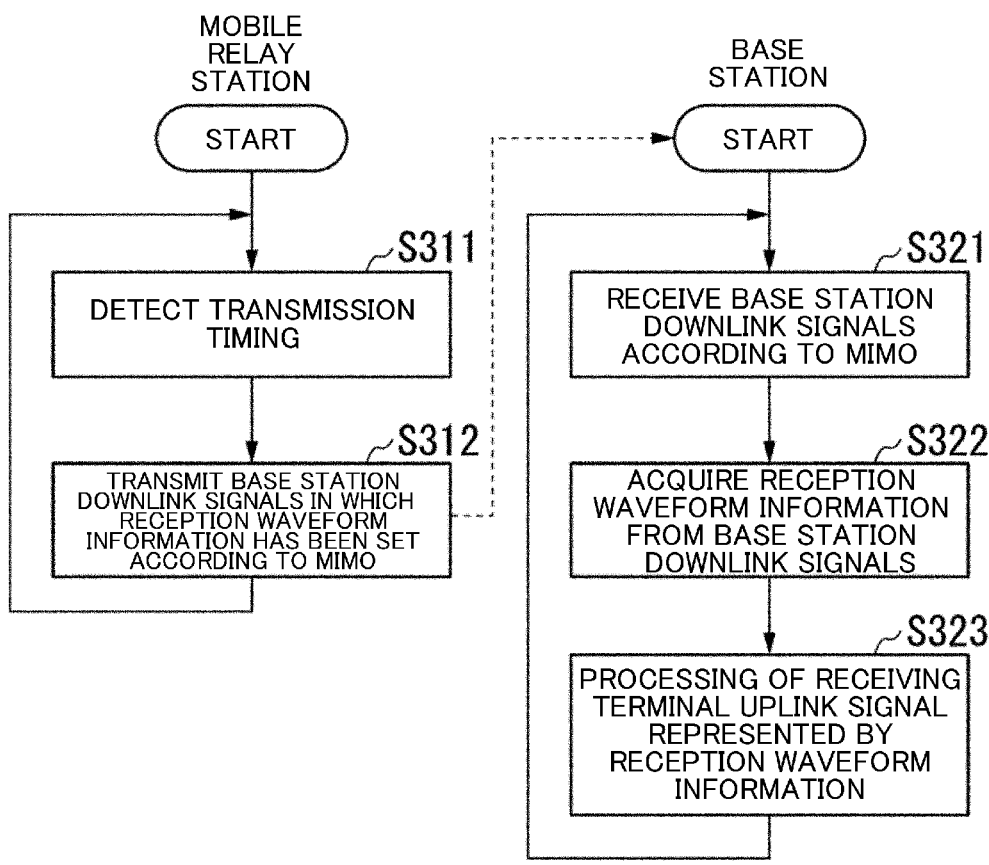
FIG. 5 is a flow chart showing processing of the wireless communication system according to the same embodiment.

FIG. 5 is a flow chart showing processing of the wireless communication system 1a when base station downlink signals are transmitted from the mobile relay station 2a. When the control unit 262 included in the base station communication unit 26 of the mobile relay station 2a detects arrival of a transmission start timing stored in the storage unit 261, the control unit 262 instructs the transmission data modulation unit 263 and the MIMO transmission unit 264 to transmit the reception waveform information (step S311). The transmission data modulation unit 263 reads the reception waveform information accumulated in the data storage unit 23 as transmission data, performs parallel conversion of the read transmission data, and then modulates the read transmission data. The MIMO transmission unit 264 weights the transmission data modulated by the transmission data modulation unit 263 by a weight indicated by the control unit 262 to generate a base station downlink signal which is a transmission signal to be transmitted through each antenna 25. The MIMO transmission unit 264 transmits each generated base station downlink signal through the antenna 25 according to MIMO (step S312). The mobile relay station 2a repeats processing from step S311.

Each antenna station 410 of the base station 4a receives the base station downlink signals from the mobile relay station 2a (step S321). Each antenna station 410 outputs a received signal obtained by converting the received base station downlink signals into an electronic signal to the MIMO reception unit 420. The MIMO reception unit 420 synchronizes timings of received signals received from the respective antenna stations 410. The MIMO reception unit 420 multiplies the received signal received by each antenna station 410 by a weight and adds up the received signals. The base station signal reception processing unit 430 demodulates the added received signal and decodes the demodulated received signal (step S322). The base station signal reception processing unit 430 outputs reception waveform information obtained by decoding to the terminal signal reception processing unit 44.

The terminal signal reception processing unit 44 performs processing of receiving a terminal uplink signal represented by waveform data included in the reception waveform information according to the same processing as in step S223 in the processing flow of the first embodiment shown in FIG. 3 (step S323). That is, the terminal signal demodulation unit 441 identifies the wireless communication method used by the terminal station 3 to transmit the terminal uplink signal on the basis of information specific to the wireless communication method included in the received signal represented by the waveform data. The terminal signal demodulation unit 441 demodulates the received signal represented by the waveform data according to the identified wireless communication method and outputs symbols obtained by demodulation to the terminal signal decoding unit 442. The terminal signal decoding unit 442 decodes the symbols input from the terminal signal demodulation unit 441 by the identified wireless communication method to obtain terminal transmission data transmitted from the terminal station 3. The terminal signal decoding unit 442 can also use a decoding method having a large calculation load, such as SIC. The base station 4a repeats processing from step S321.

According to the present embodiment, the mobile relay station can collectively transmit data that has been received from a plurality of terminal stations and accumulated within a short time with high quality at a timing at which communication with a base station can be performed.

Third Embodiment

In the present embodiment, the mobile relay station receives terminal uplink signals through a plurality of antennas. Hereinafter, differences from the second embodiment will be mainly described.

Figure 6:
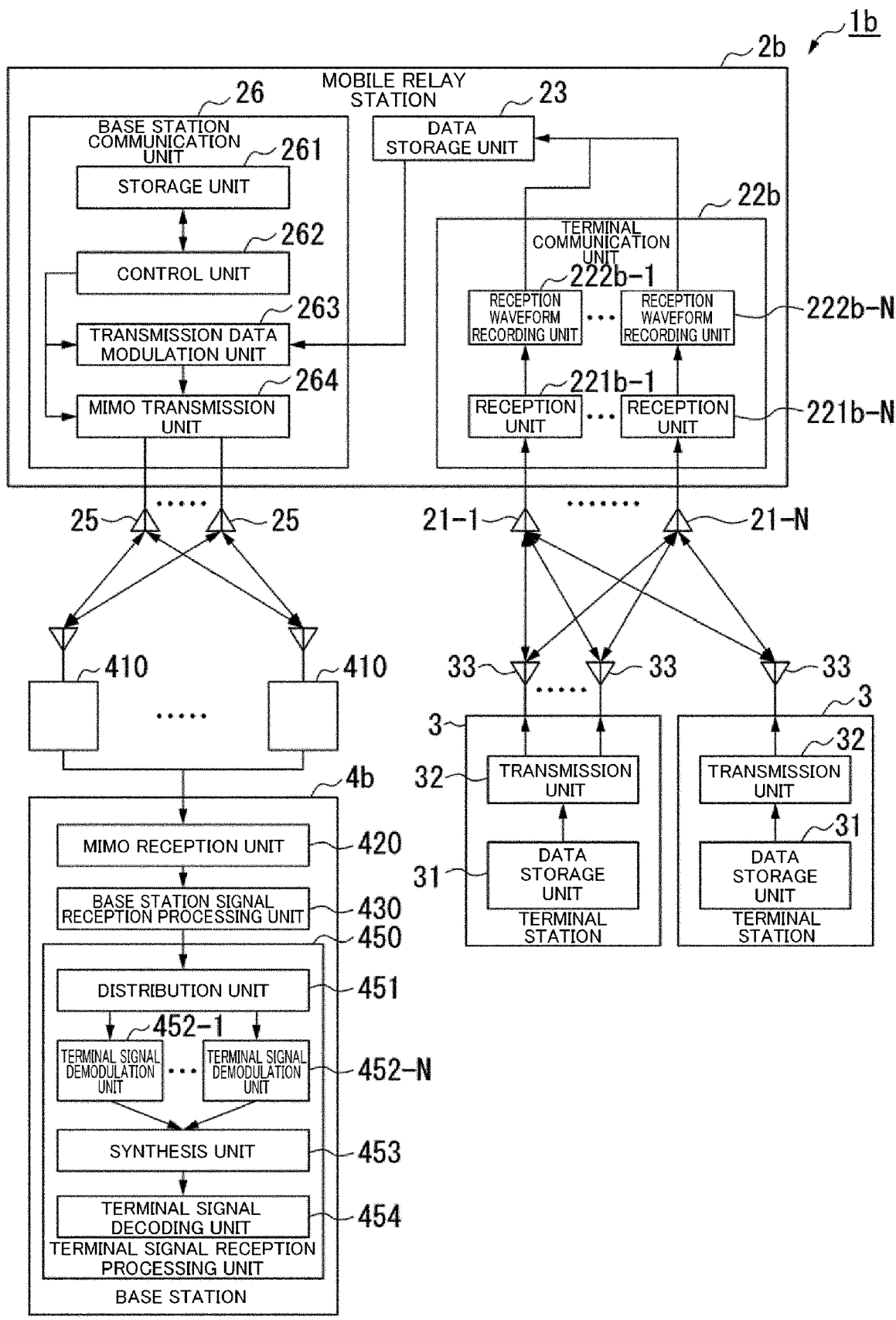
FIG. 6 is a configuration diagram of a wireless communication system according to a third embodiment.

FIG. 6 is a configuration diagram of a wireless communication system 1b according to a third embodiment. In the figure, the same components as those of the wireless communication system 1a in the second embodiment shown in FIG. 4 are designated by the same reference numerals and the description thereof will be omitted. The wireless communication system 1b includes a mobile relay station 2b, a terminal station 3, and a base station 4b.

The mobile relay station 2b includes N antennas 21 (N is an integer equal to or greater than 2), a terminal communication unit 22b, a data storage unit 23, a base station communication unit 26, and a plurality of antennas 25. The N antennas 21 are described as antennas 21-1 to 21-N.

The terminal communication unit 22b includes N reception units 221b and N reception waveform recording units 222b. The N reception units 221b are described as reception units 221b-1 to 221b-N and the N reception waveform recording units 222b are described as reception waveform recording units 222b-1 to 222b-N. The reception unit 221b-n (n is an integer equal to or greater than 1 and equal to or less than N) receives a terminal uplink signal through the antenna 21-n. The reception waveform recording unit 222b-n samples the reception waveform of the terminal uplink signal received by the reception unit 221b-n and generates waveform data representing values obtained by sampling. The reception waveform recording unit 222b-n writes reception waveform information in which an antenna identifier of the antenna 21-n, the reception time of the terminal uplink signal in the antenna 21-n, and the generated waveform data have been set in the data storage unit 23. The antenna identifier is information for identifying the antenna 21-n. The data storage unit 23 stores reception waveform information including waveform data of the terminal uplink signal received by each of the antennas 21-1 to 21-N.

The base station 4b includes a plurality of antenna stations 410, a MIMO reception unit 420, a base station signal reception processing unit 430, and a terminal signal reception processing unit 450.

The terminal signal reception processing unit 450 performs processing of receiving the terminal uplink signal indicated by the reception waveform information. Here, the terminal signal reception processing unit 450 performs processing of receiving according to the wireless communication method used for transmission by the terminal station 3 to acquire terminal transmission data. The terminal signal reception processing unit 450 includes a distribution unit 451, N terminal signal demodulation units 452, a synthesis unit 453, and a terminal signal decoding unit 454. The N terminal signal demodulation units 452 are described as terminal signal demodulation units 452-1 to 452-N.

The distribution unit 451 reads waveform data having the same reception time from the reception waveform information and outputs the read waveform data to the terminal signal demodulation units 452-1 to 452-N according to antenna identifiers associated with the waveform data. That is, the distribution unit 451 outputs the waveform data associated with the antenna identifier of the antenna 21-n to the terminal signal demodulation unit 452-n. Each of the terminal signal demodulation units 452-1 to 452-N demodulates the signal represented by the waveform data and outputs symbols obtained by demodulation to the synthesis unit 453. The terminal signal demodulation unit 452-n may perform processing of compensating for the Doppler shift in the terminal uplink signal received by the antenna 21-n of the mobile relay station 2 with respect to the signal represented by the waveform data, and then demodulate the signal. The Doppler shift applied to the terminal uplink signal received by each antenna 21-n is calculated in advance on the basis of the position of the terminal station 3 and the orbit information of the LEO equipped with the mobile relay station 2b. The synthesis unit 453 additively synthesizes symbols input from each of the terminal signal demodulation units 452-1 to 452-N and outputs the result to the terminal signal decoding unit 454. The terminal signal decoding unit 454 decodes the additively synthesized symbols to obtain terminal transmission data transmitted from the terminal station 3.

The operation of the wireless communication system 1b will be described.

Figure 7:
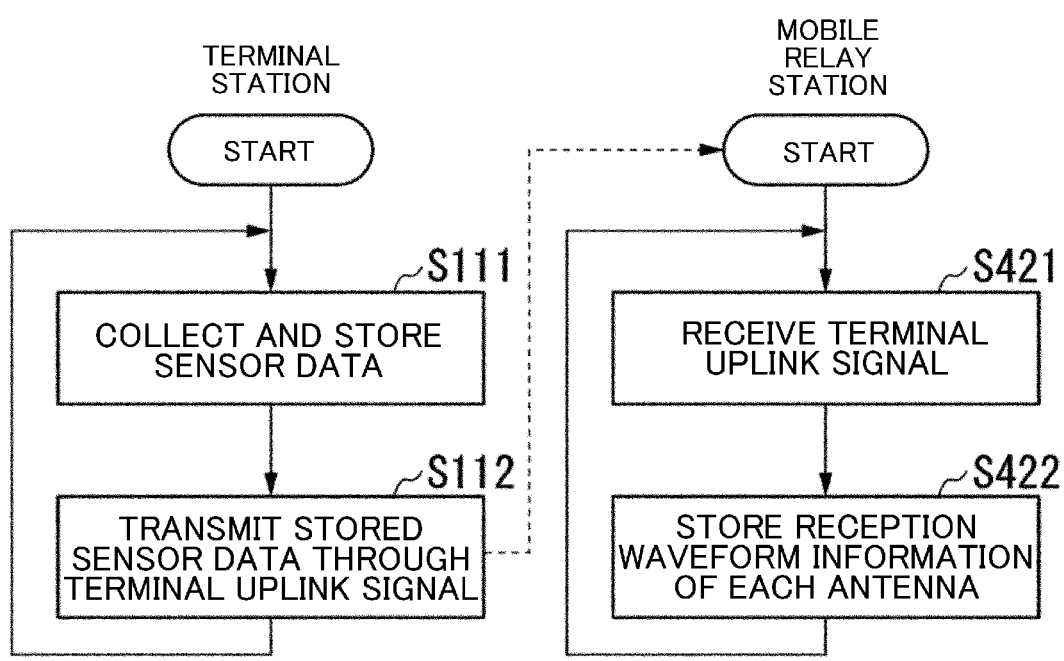
FIG. 7 is a flow chart showing processing of the wireless communication system according to the same embodiment.

FIG. 7 is a flow chart showing processing of the wireless communication system 1b when an uplink signal is transmitted from the terminal station 3. In the figure, the same processing as the processing flow of the first embodiment shown in FIG. 2 is designated by the same reference numeral. The terminal station 3 performs the same processing as processing of steps S111 and S112 in the processing flow of the first embodiment shown in FIG. 2. The terminal station 3, as well as other terminal stations 3, may perform transmission according to time division multiplexing, OFDM, MIMO, or the like.

The reception units 221b-1 to 221b-N of the mobile relay station 2b receive a terminal uplink signal transmitted from the terminal station 3 (step S421). Depending on the wireless communication method of the terminal station 3 that is a transmission source, there are cases where a terminal uplink signal is received from only one terminal station 3 on a time division basis for the same frequency and cases where terminal uplink signals are simultaneously received from a plurality of terminal stations 3 at the same frequency. The reception waveform recording unit 222b-n writes reception waveform information in which waveform data representing the waveform of the terminal uplink signal received by the reception unit 221b-n, reception time, and the antenna identifier of the antenna 21-n are associated in the data storage unit 23 (step S422). The mobile relay station 2b repeats processing from step S421.

Processing of the wireless communication system 1b when a base station downlink signal is transmitted from the mobile relay station 2b is the same as the processing flow of the second embodiment shown in FIG. 5, except for the following processing. That is, the terminal signal reception processing unit 450 performs processing of receiving the terminal uplink signal indicated by the reception waveform information in step S323. Specifically, the distribution unit 451 reads waveform data having the same reception time from the reception waveform information and outputs the read waveform data to the terminal signal demodulation units 452-1 to 452-N according to antenna identifiers associated with the waveform data. Each of the terminal signal demodulation units 452-1 to 452-N identifies the wireless communication method used by the terminal station 3 to transmit the terminal uplink signal on the basis of information specific to the wireless communication method included in a received signal represented by the waveform data. The terminal signal demodulation units 452-1 to 452-N demodulate the received signals represented by the waveform data according to the identified wireless communication method and output symbols obtained by demodulation to the synthesis unit 453.

The synthesis unit 453 additively synthesizes the symbols input from each of the terminal signal demodulation units 452-1 to 452-N. According to additive synthesis, the influence of randomly added noise is reduced although signals transmitted by the terminal station 3 are emphasized because they are correlated. Therefore, the diversity effect can be obtained with respect to terminal uplink signals simultaneously received by the mobile relay station 2b from only one terminal station 3. Further, the operation corresponds to MIMO communication performed for terminal uplink signals simultaneously received by the mobile relay station 2b from a plurality of terminal stations 3. The synthesis unit 453 outputs the additively synthesized symbols to the terminal signal decoding unit 454. The terminal signal decoding unit 454 decodes the symbols additively synthesized by the synthesis unit 453 according to the identified wireless communication method to obtain terminal transmission data transmitted from the terminal station 3. The terminal signal decoding unit 454 can also use a decoding method having a large calculation load, such as SIC.

According to the above-described embodiment, the mobile relay station receives a terminal uplink signal from a terminal station according to diversity reception, MIMO reception, or the like. Therefore, the mobile relay station can improve the link budget with respect to the terminal station.

According to the embodiments described above, the mobile relay station stores and accumulates information on a reception signal waveform of a wireless terminal uplink signal received from a terminal station without demodulating the wireless terminal uplink signal and wirelessly transmits the information to a base station at a timing at which communication is possible. The base station performs processing of receiving such as demodulation/decoding on the terminal uplink signal represented by the reception signal waveform in the mobile relay station. Therefore, a non-regenerative relay method that does not depend on a communication method can be applied to a wireless communication system using a low Earth orbit satellite. Further, the mobile relay station does not need to implement a wireless communication method used for a terminal station because it performs non-regenerative relay. Even if a terminal station that performs communication using a new wireless communication method is added, for example, it is not necessary to change the mobile relay station, and the wireless communication method may be added to a base station installed on the ground. Therefore, it is possible to simultaneously accommodate various IoT systems and it is possible to easily cope with update of the IoT systems. In addition, since a large Doppler shift applied to each terminal station can be processed by a base station instead of the mobile relay station, it is not necessary to implement a complicated non-linear operation for compensating for the Doppler shift in the mobile relay station.

In the above-described embodiments, a case where the moving body on which the mobile relay station is mounted is a LEO satellite has been described, but it may be another flying vehicle such as a geostationary satellite, a drone, or a HAPS.

According to the above-described embodiments, the wireless communication system includes a first communication apparatus, a second communication apparatus, and a mobile relay apparatus. For example, the first communication apparatus is the terminal station 3 in the embodiments, the second communication apparatus is the base stations 4, 4a, 4b in the embodiments, and the relay apparatus is the mobile relay stations 2, 2a, and 2b in the embodiments.

The relay apparatus includes a first signal reception unit, a storage unit, and a second signal transmission unit. For example, the first signal reception unit is the reception unit 221 and 221b in the embodiments, the storage unit is the data storage unit 23 in the embodiments, and the second signal transmission unit is the base station communication unit 24 and 26 in the embodiments. The first signal reception unit receives a first signal wirelessly transmitted by the first communication apparatus. For example, the first signal is a terminal uplink signal in the embodiments. The storage unit stores waveform data indicating the waveform of the first signal received by the first signal reception unit. The second signal transmission unit wirelessly transmits a second signal indicating waveform data stored in the storage unit to the second communication apparatus at a timing at which communication with the second communication apparatus can be performed. For example, the second signal is a base station downlink signal in the embodiments.

The second communication apparatus includes a second signal reception unit, a second signal reception processing unit, and a first signal reception processing unit. The second signal reception unit receives the second signal wirelessly transmitted by the relay apparatus. For example, the second signal reception unit is the antenna 41 and the reception unit 42, and also the antenna station 410 and the MIMO reception unit 420 in the embodiments. The second signal reception processing unit performs processing of receiving the second signal received by the second signal reception unit to acquire waveform data. For example, the second signal reception processing unit is the base station signal reception processing unit 43 and the base station signal reception processing unit 430 in the embodiments. The first signal reception processing unit performs processing of receiving the first signal indicated by the waveform data acquired by the second signal reception processing unit to acquire data set in the first signal by the first communication apparatus. The first signal reception processing unit is, for example, the terminal signal reception processing unit 44 and 450 in the embodiments.

The first signal reception processing unit can perform processing of receiving according to a plurality of wireless methods. Further, processing of receiving performed by the first signal reception processing unit includes processing of compensating for a Doppler shift applied to the first signal received by the first signal reception unit.

The first signal reception unit may receive the first signal through a plurality of antennas. The storage unit stores waveform data indicating the waveform of the first signal received by each of the plurality of antennas. The processing of receiving performed by the first signal reception processing unit includes processing of demodulating the first signal represented by the waveform data corresponding to each of the plurality of antennas and decoding a signal obtained by synthesizing demodulation results.

Although the embodiments of the present invention have been described in detail with reference to the drawings, specific configurations are not limited to these embodiments, and designs and the like within a range that does not deviating from the gist of the present invention are also included.

REFERENCE SIGNS LIST 1, 1a, 1b Wireless communication system
2, 2a, 2b Mobile relay station
3 Terminal station
4, 4a, 4b Base station
21, 21-1 to 21-N Antenna
22, 22b Terminal communication unit
23 Data storage unit
24, 26 Base station communication unit
25 Antenna
31 Data storage unit
32 Transmission unit
33 Antenna
41 Antenna
42 Reception unit
43, 430 Base station signal reception processing unit
44 Terminal signal reception processing unit
221, 221b-1 to 221b-N Reception unit
222, 222b-1 to 222b-N Reception waveform recording unit
241, 261 Storage unit
242, 262 Control unit
243, 263 Transmission data modulation unit
244 Transmission unit
264 MIMO transmission unit
410 Antenna station
420 MIMO reception unit
441 Terminal signal demodulation unit
442 Terminal signal decoding unit
450 Terminal signal reception processing unit
451 Distribution unit
452-1 to 452-N Terminal signal demodulation unit
453 Synthesis unit
454 Terminal signal decoding unit

The invention claimed is:

1. A wireless communication system comprising: a first communication apparatus; a second communication apparatus; and a mobile relay apparatus,
   wherein the relay apparatus includes
   a first signal receiver that receives a first signal wirelessly transmitted by the first communication apparatus at a channel and a transmission timing specific to a predetermined wireless communication method,
   a storage that stores waveform data indicating a waveform of the first signal received by the first signal receiver without demodulating the first signal, and
   a second signal transmitter that wirelessly transmits a second signal indicating the waveform data stored in the storage to the second communication apparatus at a timing at which communication with the second communication apparatus is possible, and
   wherein the second communication apparatus includes
   a second signal receiver that receives the second signal wirelessly transmitted by the relay apparatus,
   a second signal reception processor that performs processing of receiving the second signal received by the second signal receiver to acquire the waveform data, and
   a first signal reception processor that
      identifies the predetermined wireless communication method specific to the channel and the transmission timing, the identification being performed on a basis of the channel used to transmit the first signal represented by the waveform data acquired by the second signal reception processor, and
      performs demodulating and decoding of the first signal indicated by the waveform data on a basis of the predetermined wireless communication method identified to acquire data set in the first signal by the first communication apparatus.

2. The wireless communication system according to claim 1, wherein
   the first signal reception processor performs processing of receiving the first signal according to a plurality of wireless methods.

3. The wireless communication system according to claim 1, wherein
   the demodulating and decoding performed by the first signal reception processor includes processing of compensating for a Doppler shift applied to the first signal received by the first signal receiver.

4. The wireless communication system according to claim 1, wherein
   the first signal receiver receives the first signal through a plurality of antennas,
   the storage stores waveform data indicating the waveform of the first signal received by each of the plurality of antennas, and the demodulating and decoding performed by the first signal reception processor includes processing of demodulating the first signal indicated by the waveform data corresponding to each of the plurality of antennas and decoding a signal obtained by synthesizing demodulation results.

5. The wireless communication system according to claim 1, wherein
the relay apparatus is included in a low Earth orbit satellite, and
the first communication apparatus and the second communication apparatus are installed on the Earth.

* * * * *